Oct. 25, 1960     C. A. RAFFERTY     2,958,030
OSCILLATION SUPPRESSING SYSTEM FOR AIRCRAFT MOTOR CONTROL
Filed May 13, 1955
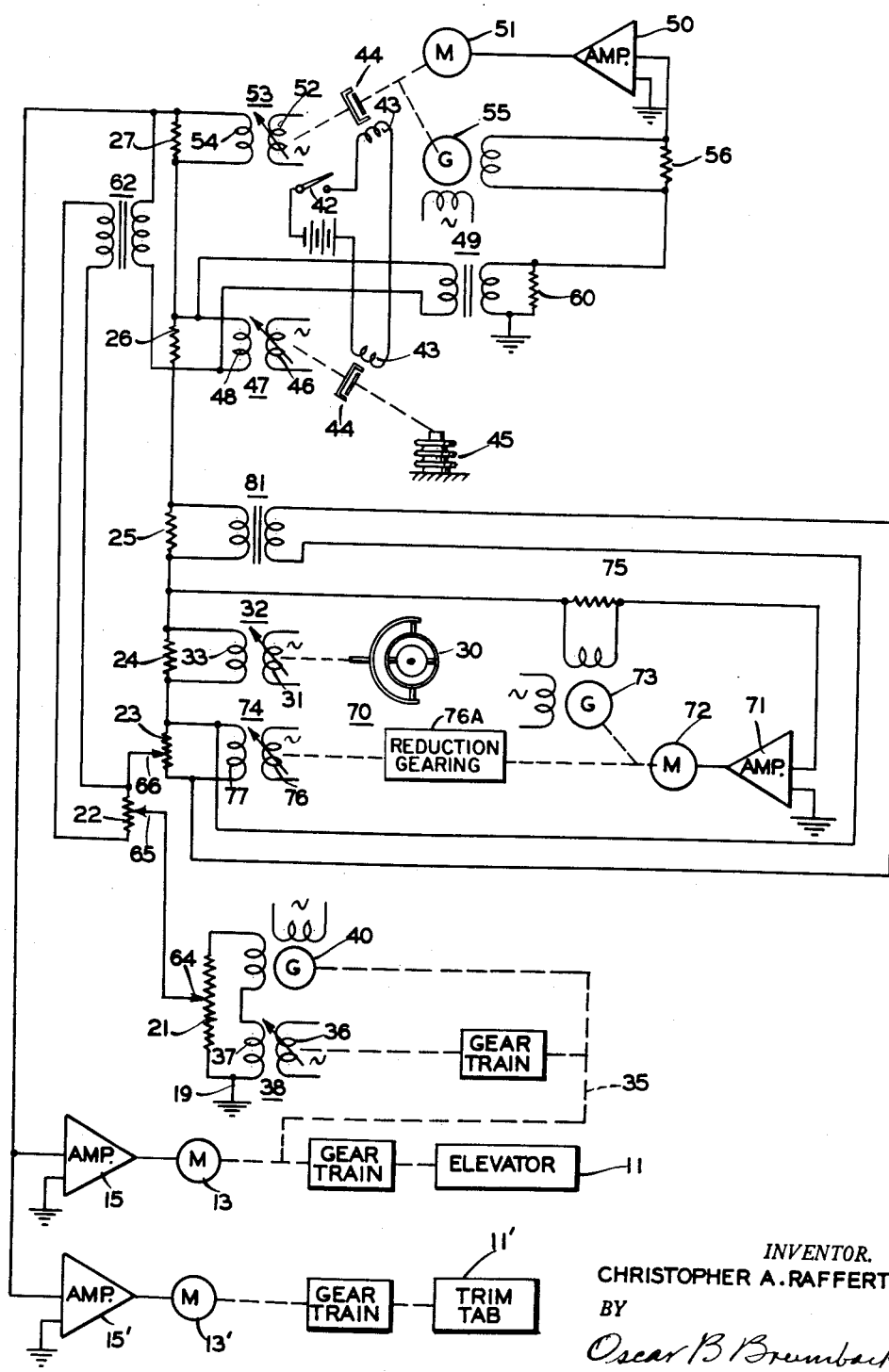
INVENTOR.
CHRISTOPHER A. RAFFERTY
BY
Oscar B Brumback
ATTORNEY

United States Patent Office 2,958,030
Patented Oct. 25, 1960

2,958,030

OSCILLATION SUPPRESSING SYSTEM FOR AIRCRAFT MOTOR CONTROL

Christopher A. Rafferty, Brooklyn, N.Y., assignor to The Bendix Corporation, a corporation of Delaware Filed May 13, 1955, Ser. No. 508,023

9 Claims. (Cl. 318—489)

This invention relates, generally, to automatic control systems for aircraft and, more particularly, to automatic control systems having a provision for reducing the slow oscillation of the aircraft when the craft is under the control of the automatic steering system.

Generally, an automatic control system detects a deviation of an aircraft from a reference condition and applies a control effect to the craft to reduce the deviation. Usually the detection and correction is made with such rapidity that any resulting oscillations are of high frequency. However, due to the friction, back-lash, and stretch of the cables in the rigging connecting the control system and the control surfaces, the control effect may not be proportional to the deviation. This may cause a slow oscillation of the craft about the reference. Increasing the value of the signal corresponding to the deviation error when the deviation is sustained overcomes this condition to some extent. However, since the error signal is opposed by the follow up signal, the increase in the error signal for a sustained deviation changes the over-all equilibrium of the control system, and may result in short time oscillations if the increase exceeds predetermined limits.

An object of the present invention, therefore, is to provide an automatic control system with novel provision for increasing the extent of the control surface displacement with respect to the deviation of the craft from a reference condition for slow oscillations of the craft without changing the over-all equilibrium of the system.

Another object is to provide a novel means for increasing the value of the reference error relative to the servo follow up signals for sustained error from reference.

A further object is to increase the control effect applied to the craft for deviation from reference when the frequency of deviation is low without appreciably changing the control effect when the frequency of deviation is high.

The present invention contemplates a novel aircraft automatic control system wherein the signal which results from the reference signal (corresponding to the deviation of the craft from reference condition) being opposed by the follow up signal (corresponding to displacement of a control surface from a normal position) is applied to the motor that displaces the control surface and wherein provision is made for increasing the effect of the resultant signal on a long time basis.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single sheet of drawing illustrates schematically an automatic control system for control of an aircraft in accordance with the present invention.

An automatic pilot system generally comprises three channels of control: pitch, roll and yaw. Although the pitch channel only has been illustrated in the interests of simplicity, the same principles will apply with regard to the other channels.

Turning now to the drawing, the elevator control surface 11 is movable by a conventional induction motor 13 in response to the output of a conventional amplifier 15 such as that described in U.S. Patent No. 2,625,348, issued January 13, 1954 to Noxon et al. The summation of the signals supplied to the input of amplifier 15 by way of the series connected potentiometers 21–23 and resistors 24–27 constituting the pitch signal chain determines the output.

The pitch attitude signal across resistor 24 is provided by a conventional vertical gyro 30 having a suitable erection system (not shown). An inductive device 32 is connected to the trunnion of the gyro in a known manner so that displacement of the craft in pitch relatively displaces rotor 31 and stator 33. Thus, the signal developed at resistor 24 corresponds in amplitude and phase to the extent and direction of displacement of the craft from a reference attitude.

When the craft is at the reference attitude and is in a steady state condition, the net signal input to amplifier 15 is zero. A trim tab amplifier 15' and motor 13' operate a trim surface 11' to relieve any load on the elevator surface and maintain the craft in a trim condition at the reference attitude. Upon any displacement from this reference attitude, the signal across resistor 24 is applied to amplifier 15. The resulting output of amplifier 15 operates motor 13 in a direction to displace elevator surface 11 to return the craft to reference.

Through a mechanical connection 35, the displacement of the surface displaces rotor 36 relative to stator 37 of inductive device 38 to develop a follow up signal across potentiometer 21. A conventional rate generator 40 connected to motor 13 also develops across potentiometer 21 a signal corresponding in amplitude and phase to the rate and direction of operation of motor 13. Thus, the combined rate and displacement signals appear across potentiometer 21.

When the craft is to be maintained at a constant altitude, switch 42 is moved to a closed circuit position, thereby energizing coils 43 and engaging clutches 44. Upon any displacement of the craft from this engaged altitude, the movement of aneroid 45 displaces rotor 46 of inductive device 47 relative to stator 48 to develop across resistor 26 a signal corresponding in phase and amplitude to the extent and direction of the displacement. This altitude control may be generally similar to that described in U.S. Patent No. 2,657,350, issued to F. H. S. Rossire on October 27, 1953.

The signal from stator 48 is also applied by way of a coupling transformer 49 to a signal chain for an amplifier 50 which operates the motor 51 of an integrator system. Motor 51 displaces rotor 52 of an inductive device 53 relative to stator 54 and also drives a conventional rate generator 55 which develops a feed back signal across potentiometer 56 so that the rate of operation of motor 51 is made proportional to the amplitude of the input signal across potentiometer 60. Thus, the signal developed across potentiometer 27 corresponds to the time integral of the altitude error signal. By way of coupling transformer 62, the combined altitude time integral signals are applied to potentiometer 22.

The wipers 64 and 65 of potentiometers 21 and 22 are connected so that the relative values of the follow up and altitude signals may be adjusted. Potentiometer 21 is grounded, and potentiometer 22 is connected to the wiper 66 of potentiometer 23. The signal across potentiometer 23 is provided by a lag network 70 comprised of an amplifier 71, a motor 72, a rate generator 73, and an inductive device 74. Thus, the signal chain for motor 72 traced from ground lead 19 includes potentiometers 21, 22, and 23 and resistors 24 and 75.

In response to a signal at amplifier 71, motor 72 operates to displace through a suitable low speed drive or reduction gear train 76A a rotor 76 relative to the stator 77 of an inductive device 74 in a direction to develop a signal through potentiometer 23 to reduce the net input to amplifier 71 to zero. A conventional rate generator 73 driven by motor 72 through a suitable high speed drive develops across resistor 75 an output signal varying in phase and magnitude with the direction and rate of operation of the motor.

When the input signal to amplifier 71 is of short duration, motor 72 cannot effectively follow the signal because of the high value of the output of generator 73 when motor 72 moves rapidly. Thus, high frequency signals do not result in a signal at potentiometer 23 for addition to the signal chain. However, when the input signal persists for a period of time, motor 72 is able to respond to the signal to drive rotor 76 through the low speed reduction gear train 76A and displace rotor 76 to develop a signal through potentiometer 23 to reduce the input to the amplifier 71 to null. The output of stator 77 is also applied by way of coupling transformer 81 across resistor 25 in such a manner as to add to the signal from vertical gyro 30. When the signals from potentiometers 21 and 22, and resistor 24 become zero, the prevailing or error signal applied by the inductive device 74 through the potentiometer 23 operates motor 72 to return inductive device 74 to a no signal or null position.

During short period displacement of the craft about the pitch axis due to gusts or other causes, the attitude signal will operate motor 13 to correct for the displacement; but the short period of existence of the signal is not sufficiently great for motor 72 to respond to the attitude signal, so no additional signal from inductive device 74 is applied to amplifier 15. However, if the displacement be sustained for a period of time as when the craft is slowly oscillating about the pitch axis, the attitude displacement signal will be sustained for a sufficient length of time to operate motor 72 and provide an additional signal at potentionmeter 23 and resistor 25.

To prevent a steady state unbalance condition of the over-all system which may result in oscillation, the output across potentiometer 21 corresponding to the extent and rate of motor operation is also applied to amplifier 71. Thus, the increased attitude error signal is opposed by an increased follow up signal so that the all-over equilibrium of the control system is not disturbed.

Due to the position of wiper 66 of potentiometer 23, it will be noted that only a fraction of the signal from the inductive device 74 applied across the potentiometer 23 may be utilized to null the signal chain in the input to the amplifier 71, while the full signal from the inductive device 74 is applied through the coupling transformer 81 across the resistor 25 to the signal chain in the input to the amplifiers 15 and 15'. Thus, the signal applied across the resistor 25 by the inductive device 74 may be a multiple of the error signal in the signal input to amplifier 71 applied by the inductive device 74 through the potentiometer 23, as heretofore explained.

The foregoing has presented a novel automatic control system for an aircraft wherein provision is made for changing the relative values of the control effect applied to the servomotor for the control surface for short and long periods of oscillations without appreciably disturbing the over-all equilibrium of the system.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. An automatic control system for an aircraft having a movable surface, comprising reference means for detecting deviation of the craft from a reference condition about an axis thereof, power means under control of said reference means for moving said surface to correct for said deviation, said detection and correction normally taking place with great rapidity so that any oscillation of the craft is of high frequency, follow up means for measuring the extent of correction and opposing the control of said power means by said reference means whereby the extent of correction corresponds to the extent of deviation, other control means differentially operated by said reference means and said follow-up means, means to render said other means ineffective upon said detection and correction occurring with said great rapidity, said craft being subject to oscillation about said axis at a low frequency, whereupon the differential operation of said other means by said reference and follow up means is sustained, and means responsive to the differential operation of said other means and effective to act with said reference means for additionally controlling said power means.

2. An automatic control system for a craft having a movable surface, comprising reference means responsive to deviation of the craft from a reference for developing a corresponding signal, power means for moving said surface to correct for said deviation, follow up means responsive to the extent of surface movement for developing a corresponding signal, means combining said signals in opposed relation to provide a resultant signal for control of said power means, said deviation and correction normally taking place with great rapidity so that any resulting oscillation of the craft about said reference is of high frequency so that said resultant signal is of short duration in controlling said power means, other means for combining components of the signals developed by said reference means and said follow-up means in opposed relation to provide another resultant signal, means to render said other resultant signal ineffective when of said short duration, said craft being subject to oscillation about said reference at a low frequency so that said other resultant signal may be of sustained duration, and means responsive to said sustained other resultant signal for developing an additional signal to aid said first-mentioned resultant signal in controlling said power means to move said surface and suppress said low frequency oscillation.

3. An automatic control system for a craft having a movable surface, comprising reference means responsive to deviation of the craft from a reference for developing a corresponding signal, power means for moving said surface to correct for said deviation, follow up means responsive to the extent of surface movement for developing a corresponding signal, means combining said signals in opposed relation to provide a resultant signal for control of said power means, said deviation and correction normally taking place with great rapidity so that any resulting oscillation of the craft is of high frequency and said resultant signal is of transient duration in controlling said power means, other means for combining components of the signals developed by said reference means and said follow-up means in opposed relation to provide another resultant signal, said craft being subject to oscillation about said reference at a low frequency so that said other resultant signal may be of sustained duration, and means responsive to said sustained other resultant signal for developing an additional signal to aid said first-mentioned resultant signal in controlling said power means, said last named means including a signal device and means capable of response to said sustained other resultant signal and incapable of response to said other resultant signal of transient duration for actuating said signal device.

4. An automatic control system for a craft having a movable surface, comprising reference means responsive to deviation of the craft from reference for developing a corresponding signal, power means operable for moving said surface to correct for said deviation, follow up means responsive to the extent of surface movement for developing a corresponding signal, means combining said signals in opposed relation to provide a resultant signal for control of said power means, said deviation and correction normally taking place with great rapidity so that any resulting oscillation of the craft is of high frequency and said resultant signal is of transient duration in controlling said power means, other means for combining components of the signals developed by said reference means and said follow-up means in opposed relation to provide another resultant signal, said craft also being subject to oscillation about said reference at a low frequency so that said other resultant signal may be of sustained duration, and means responsive to said sustained other resultant signal for developing an additional signal to aid said first-mentioned resultant signal in controlling the operation of said power means, said last named means including a signal device, a motor for actuating said signal device in response to said other resultant signal, and a rate generator for feeding back a signal corresponding to the rate of motor operation to oppose the response of said motor to said other resultant signal, whereby said motor is rendered incapable of response to said other resultant signal when it is of transient duration.

5. An automatic control system for an aircraft having a movable surface, comprising power means for moving said surface, reference means responsive to deviation of said craft from a reference condition for developing a signal whose magnitude and sense varies with the extent and direction of said deviation, follow up means for developing a signal whose magnitude and sense varies with the direction and extent of displacement of said surface from normal position, means connecting said reference and follow up signals in opposed relation to provide a resultant signal for control of said power means, said craft deviation and surface movement taking place with great rapidity so that said resultant signal persists for a short time in controlling said power means, other means for combining components of the signals developed by said reference means and said follow-up means in opposed relation to provide another resultant signal, means to render said other resultant signal ineffective when it persists for said short time, said craft being subject to slowly oscillating about said condition whereupon said other resultant signal exists for a sustained duration, and means responsive to said sustained other resultant signal for developing an additional signal to aid said first-mentioned resultant signal in controlling said power means, said additional signal having a magnitude and phase proportional to the magnitude and phase of said other resultant signal, the control of said power means by said additional signal reducing said oscillation.

6. An automatic control system for an aircraft having a movable surface, comprising power means for moving said surface, reference means responsive to deviation of said craft from a reference attitude for developing a signal whose magnitude and sense varies with the extent and direction of said deviation, follow up means for developing a signal whose magnitude and sense varies with the direction and extent of displacement of said surface from normal position, means connecting said reference and follow up signals in opposed relation to provide a resultant signal for control of said power means, said craft deviation and surface movement taking place with great rapidity so that said resultant signal due to said deviation persists for a short time in controlling said power means, other means for combining components of the signals developed by said reference means and said follow-up means in opposed relation to provide another resultant signal, means to render said other resultant signal ineffective when it persists for said short time, said craft being subject to slow oscillation about said reference attitude whereupon said other resultant signal exists for a sustained duration, and means responsive to said sustained other resultant signal for developing for the control of said power means an additional signal having a magnitude and phase proportional to the magnitude and phase of said other resultant signal, whereby the control of said power means by said additional signal reduces said oscillation.

7. An automatic control system for an aircraft having a movable pitch control surface, comprising power means operable for moving said surface, reference means responsive to deviation of said craft from a reference altitude for developing a signal whose magnitude and sense varies with the extent and direction of said deviation, follow up means for developing a signal whose magnitude and sense varies with the direction and extent of displacement of said surface from normal position, means connecting said reference and follow up signals in opposed relation to provide a resultant signal for control of said power means, said altitude deviation and surface movement taking place with great rapidity so that said resultant signal due to said deviation persists for a short time in controlling said power means, other means for combining components of the signals developed by said reference means and said follow-up means in opposed relation to provide another resultant signal, means to render said other resultant signal ineffective when it persists for said short time, said craft also being subject to slow oscillation about said reference altitude whereby said other resultant signal persists for a long period of time, and means responsive to said longer persistent other resultant signal for developing an additional signal to aid said first-mentioned resultant signal in controlling said power means to suppress said slow oscillation.

8. In an automatic control system for an aircraft having a movable surface for controlling the craft, sensing means for detecting deviation of the craft from a reference and developing a corresponding signal, follow-up means responsive to surface movement and developing a signal corresponding thereto, means combining the signals in opposed relation to provide a resultant signal having a high frequency component and a low frequency component, lag network means responsive to the low frequency component of the resultant signal and providing an output corresponding thereto, and an actuator drivably connected to the surface and responsive to the resultant signal and the output of the low-pass filter.

9. In an automatic control system for an aircraft having a movable surface for controlling the craft, an actuator drivably connected to the surface, sensing means for detecting deviation of the craft from a reference and developing a corresponding signal, follow-up means responsive to surface movement and developing a signal corresponding thereto, means combining the signals in opposed relation to provide a resultant signal having a high frequency component and a low frequency component, lag network means responsive to the low frequency component of the resultant signal and providing an output corresponding thereto, and means for combining the resultant signal and the output of the low-pass filter in additive relation and controlling operation of the actuator.

References Cited in the file of this patent

UNITED STATES PATENTS

| | | |
|---|---|---|
| 2,512,902 | Rossire | June 27, 1950 |
| 2,568,719 | Curry | Sept. 25, 1951 |
| 2,664,530 | Young | Dec. 29, 1953 |